(12) United States Patent
Proudkii et al.

(10) Patent No.: US 8,236,144 B2
(45) Date of Patent: Aug. 7, 2012

(54) METHOD AND APPARATUS FOR MULTIPLE RESONANT STRUCTURE PROCESS AND REACTION CHAMBER

(75) Inventors: Vassilli P. Proudkii, Edmonton (CA); Kirk McNeil, Edmonton (CA); Joe Michael Yarborough, Tucson, AZ (US)

(73) Assignee: RF Thummim Technologies, Inc. (CA)

( * ) Notice: Subject to any disclaimer, the term of this patent is extended or adjusted under 35 U.S.C. 154(b) by 324 days.

(21) Appl. No.: 12/234,503

(22) Filed: Sep. 19, 2008

(65) Prior Publication Data

US 2009/0078559 A1    Mar. 26, 2009

Related U.S. Application Data

(60) Provisional application No. 60/974,439, filed on Sep. 21, 2007.

(51) Int. Cl.
*A62D 3/10* (2007.01)
*A62D 3/178* (2007.01)
*B01J 19/08* (2006.01)
*B01J 19/12* (2006.01)
*H05B 6/80* (2006.01)
*H01P 7/06* (2006.01)

(52) U.S. Cl. ............... 204/157.15; 204/157.43; 422/186; 422/186.04; 219/687; 333/230; 333/231; 333/232

(58) Field of Classification Search ............ 204/157.15, 204/157.43; 422/186, 186.04; 219/687; 333/230, 231, 232
See application file for complete search history.

(56) References Cited

U.S. PATENT DOCUMENTS 2,676,257 A    4/1954    Hebenstreit ............... 343/768
2,714,661 A    8/1955    Norton ............................ 331/3
(Continued)

FOREIGN PATENT DOCUMENTS
WO    WO 2009/039521    3/2009

OTHER PUBLICATIONS

Partial European Search Report dated Feb. 7, 2010, (5 pgs).
(Continued)

*Primary Examiner* — Keith Hendricks
*Assistant Examiner* — Colleen M Raphael
(74) *Attorney, Agent, or Firm* — Hayes Soloway P.C.

(57) ABSTRACT

A method and apparatus is described comprising of a plurality of electromagnetic resonant structures coupled to a common process or reaction volume, such that resonance of each structure is maintained while the process or reaction volume is a part of each resonant structure. At the same time, each resonant structure is matched to its respective electromagnetic generator. Such a system allows each generator and its delivery system to run at rated power, with summation of all the powers occurring in the common process or reaction volume. In various embodiments of this invention, the various electromagnetic generators can run at the same or different frequencies. The various resonant structures can be single mode or multimode, or a mixture of single mode and multi mode. The various resonant structures can be arranged spatially in order to couple several structures to the process or reaction volume. Various spatial arrangements also allow coupling of either the electric or the magnetic field to the process or reaction volume, as well as allowing the generation of rotating fields in the process or reaction volume with any orientation of the rotating field with respect to the process or reaction volume.

71 Claims, 8 Drawing Sheets

U.S. PATENT DOCUMENTS

| | | | | |
|---|---|---|---|---|
| 3,170,519 | A * | 2/1965 | Haagensen | 166/60 |
| 3,588,594 | A | 6/1971 | Matsuno et al. | 315/111.21 |
| 3,882,424 | A | 5/1975 | Debois et al. | 332/127 |
| 4,004,122 | A * | 1/1977 | Hallier | 219/697 |
| 4,153,533 | A * | 5/1979 | Kirkbride | 204/157.15 |
| 4,279,722 | A * | 7/1981 | Kirkbride | 204/157.15 |
| 4,336,434 | A * | 6/1982 | Miller | 219/747 |
| 4,435,260 | A | 3/1984 | Koichi et al. | |
| 4,565,670 | A | 1/1986 | Miyazaki et al. | 422/186.04 |
| 4,631,380 | A * | 12/1986 | Tran | 219/697 |
| 4,728,368 | A | 3/1988 | Pedziwiatr | 422/20 |
| 4,855,695 | A * | 8/1989 | Samardzija | 333/17.3 |
| 4,883,570 | A * | 11/1989 | Efthimion et al. | 204/164 |
| 4,922,180 | A | 5/1990 | Saffer et al. | 324/639 |
| 4,934,561 | A * | 6/1990 | Ness et al. | 222/1 |
| 4,957,606 | A | 9/1990 | Juvan | 204/164 |
| 4,968,403 | A * | 11/1990 | Herbst et al. | 208/113 |
| 5,079,507 | A * | 1/1992 | Ishida et al. | 333/17.3 |
| 5,114,684 | A | 5/1992 | Walker | 422/21 |
| 5,200,043 | A * | 4/1993 | Ooe et al. | 205/763 |
| 5,262,610 | A | 11/1993 | Huang et al. | |
| 5,279,669 | A | 1/1994 | Lee | 118/723 |
| 5,447,052 | A | 9/1995 | Delaune et al. | |
| 5,471,037 | A * | 11/1995 | Goethel et al. | 219/750 |
| 5,507,927 | A * | 4/1996 | Emery | 204/157.43 |
| 5,521,605 | A | 5/1996 | Koike | 343/702 |
| 5,539,209 | A | 7/1996 | Maarschalkerweerd | 422/24 |
| 5,540,886 | A | 7/1996 | Warmbier et al. | |
| 5,770,982 | A * | 6/1998 | Moore | 333/32 |
| 5,834,744 | A * | 11/1998 | Risman | 219/697 |
| 5,902,404 | A * | 5/1999 | Fong et al. | 118/723 ME |
| 5,911,885 | A | 6/1999 | Owens | 204/155 |
| 5,914,014 | A * | 6/1999 | Kartchner | 204/157.15 |
| 6,027,698 | A | 2/2000 | Cha | 422/186 |
| 6,077,400 | A * | 6/2000 | Kartchner | 204/157.15 |
| 6,187,988 | B1 | 2/2001 | Cha | 588/227 |
| 6,192,318 | B1 * | 2/2001 | Yogo et al. | 333/17.3 |
| 6,193,878 | B1 * | 2/2001 | Morse et al. | 422/186 |
| 6,207,023 | B1 | 3/2001 | Cha | 204/157.3 |
| 6,259,334 | B1 * | 7/2001 | Howald | 333/17.3 |
| 6,261,525 | B1 * | 7/2001 | Minaee | 422/186 |
| 6,409,975 | B1 | 6/2002 | Seyed-Yagoobi et al. | 422/186 |
| 6,419,799 | B1 | 7/2002 | Cha | 204/157.3 |
| 6,572,737 | B2 | 6/2003 | Dalton | 204/157.15 |
| 6,592,723 | B2 | 7/2003 | Cha | 204/157.52 |
| 6,677,828 | B1 * | 1/2004 | Harnett et al. | 333/17.3 |
| 6,689,252 | B1 | 2/2004 | Shamouiloa et al. | 204/157.15 |
| 6,696,662 | B2 | 2/2004 | Jewett et al. | |
| 6,740,858 | B2 * | 5/2004 | Tracy et al. | 422/186 |
| 6,888,116 | B2 | 5/2005 | Dalton | |
| 6,933,482 | B2 * | 8/2005 | Fagrell et al. | 219/695 |
| 6,960,747 | B2 * | 11/2005 | Risman | 333/230 |
| 7,210,424 | B2 | 5/2007 | Tolmachev et al. | 118/723 |
| 7,495,443 | B2 | 2/2009 | Leussler et al. | 324/318 |
| 7,518,466 | B2 * | 4/2009 | Sorensen et al. | 333/17.3 |
| 7,629,497 | B2 * | 12/2009 | Pringle | 585/241 |
| 2004/0074760 | A1 | 4/2004 | Portnoff et al. | 204/157.15 |
| 2005/0106873 | A1 * | 5/2005 | Hoffman et al. | 438/689 |
| 2005/0155854 | A1 | 7/2005 | Shufflebotham et al. | 204/164 |
| 2006/0073084 | A1 * | 4/2006 | Burkitbayev | 422/186 |
| 2006/0102622 | A1 * | 5/2006 | Gregoire et al. | 219/695 |
| 2007/0102279 | A1 | 5/2007 | Novak | 204/157.6 |
| 2007/0131591 | A1 * | 6/2007 | Pringle | 208/402 |
| 2007/0240975 | A1 * | 10/2007 | Foret | 204/157.15 |
| 2008/0202982 | A1 | 8/2008 | Tooley | 208/106 |
| 2008/0233020 | A1 | 9/2008 | Purta et al. | 422/186 |
| 2009/0260973 | A1 | 10/2009 | Proudkii et al. | 204/164 |

OTHER PUBLICATIONS

U.S. Office Action dated Dec. 6, 2010 (41 pages).
European extended Search Report, Nov. 8, 2010 (9 pages).
PCT Search Report and Written Opinion, International Appln. No. PCT/US2011/028810, dated Mar. 17, 2011, (10 pages).
Official Action issued in corresponding CIP case, U.S. Appl. No. 12/420,770 dated May 19, 2011 (52 pgs).

* cited by examiner

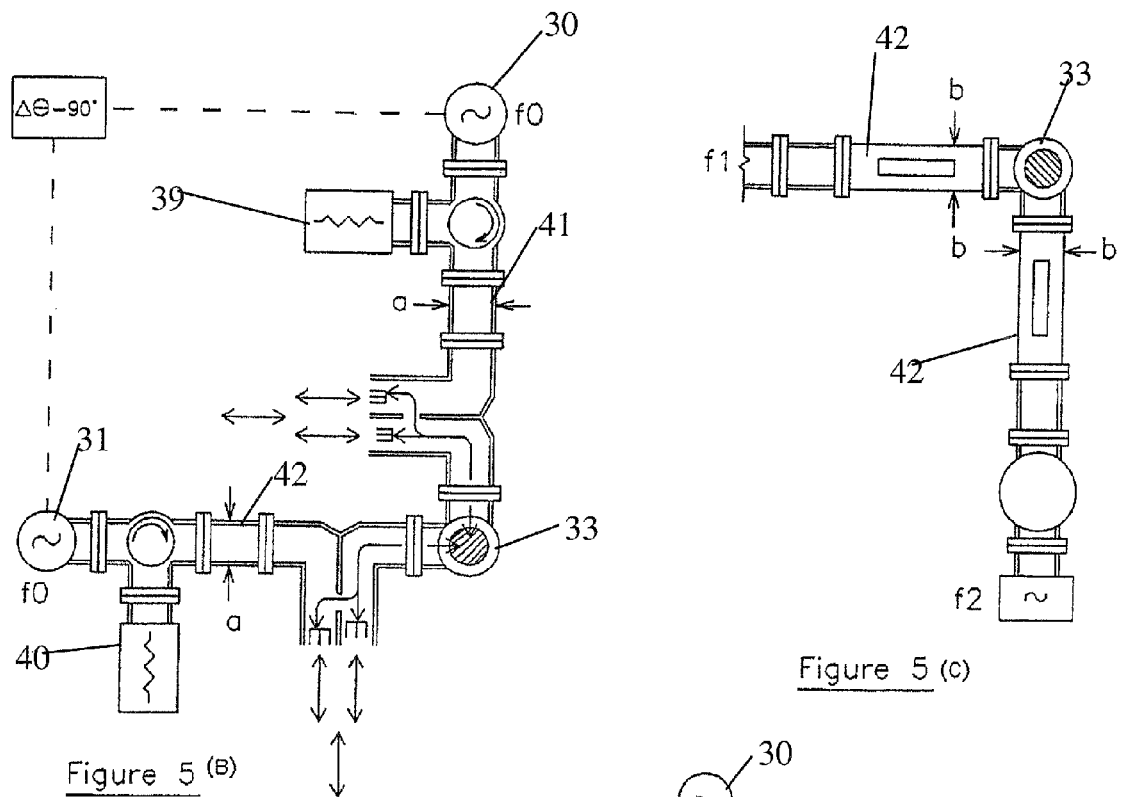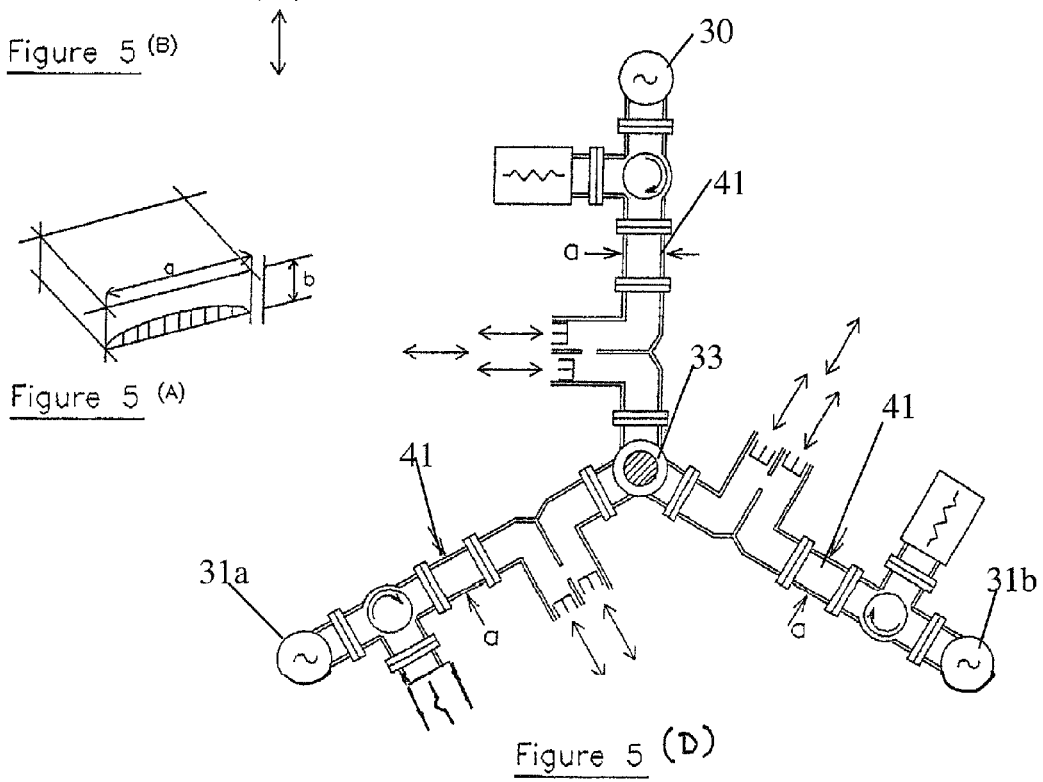
Figure 5 (A)
Figure 5 (B)
Figure 5 (C)
Figure 5 (D)

METHOD AND APPARATUS FOR MULTIPLE RESONANT STRUCTURE PROCESS AND REACTION CHAMBER

CROSS REFERENCE TO RELATED APPLICATION

This application claims priority from U.S. Provisional Patent Application Ser. No. 60/974,439, filed Sep. 21, 2007, the contents of which are incorporated herein by reference in their entirety.

FIELD OF INVENTION

This invention relates generally to processing or reaction of materials. The invention has particular utility in the use of electromagnetic energy to promote a chemical process or reaction, such as the breaking of chemical bonds in large molecules and will be described in connection with such utility, although other utilities are contemplated. An example of this is to break molecular bonds in long hydrocarbon chains so that shorter chain and lower weight hydrocarbons are created. Such a process could for example reduce heavy, viscous oil to a less viscous consistency so that it can be more easily transported through a pipe.

BACKGROUND OF THE INVENTION

Petroleum-based materials are integral to the world's economy and demand for petroleum based fuels and petroleum based products is increasing. As the demand rises, there is a need to efficiently and economically extract petroleum-based materials to fulfill that demand. As such, it would be advantageous to not only be able to extract petroleum-based materials from the earth, but to recycle consumer products to recapture those petroleum-based materials.

Worldwide oil consumption is estimated at in excess of seventy million barrels per day and growing. Thus, there is a need for sufficient oil supplies. Tar sands, oil sands and oil shales, contain large quantities of oil; however, extraction of oil from these materials is costly and time-consuming.

Pumping heavy oil from oil sands is difficult. Typically, up to 30% by volume of a solvent or diluent must be added to such oil to make it thin enough to pump through pipelines. This adds a cost of as much as 15% to a barrel of oil at current prices. Thus, the ability to economically break some of the molecular bonds to make the oil less viscous could have a significant impact on the recovery of useful products from oil sands. Another problem that is becoming increasingly important is the disposal of toxic wastes. Generally to render wastes harmless requires breaking chemical bonds in the waste and possibly then adding other substances to form new bonds.

In prior art, it is known that a process or reaction volume can be excited in a resonant electromagnetic structure with an electromagnetic generator coupled to it. The structure is generally multimode (i.e., multi-spatial mode). A microwave oven is an example of such an apparatus.

The resonant structure may also be a single mode structure, wherein a single frequency is resonant in a single spatial mode. A single mode resonant structure is smaller than a multimode resonant structure and cannot handle as much power input. In many applications, it is desirable to create a plasma in a process or reaction volume, and it is generally easier in a single mode resonant structure to establish a stable plasma and to maintain matching to the generator and its delivery system.

It also is known that a reaction or process volume can be excited in a multimode resonant structure coupled to a plurality of electromagnetic generators. For example, U.S. Pat. No. 7,227,097 describes a system using multiple generators coupled to a common multimode resonant structure, with a plasma created in the common resonant cavity. This configuration has the advantage of permitting more input power, but the multimode cavity is far more sensitive to plasma fluctuations. Matching and maintaining the electromagnetic generators and their respective delivery systems is also difficult in this configuration. There also is more coupling of the various generators through plasma instabilities.

It also is possible to have multiple generator inputs to a single mode resonant structure, but in the single mode configuration each generator would be required to have the same frequency and phase, and the resonant structure would limit how much power could be applied.

SUMMARY OF THE INVENTION

The present invention provides a system, i.e. a method and apparatus for treating a process or reaction volume with multiple electromagnetic generators. This is accomplished by applying the output of several electromagnetic generators to respective resonant structures, with the several resonant structures then coupled to a common process or reaction volume. The present invention further provides for matching and tuning the electromagnetic generators to their respective resonant structures, for controlling the power input to each resonant structure, and for controlling the phase of any inputs that have the same resonant frequency. The various resonant structures are arranged such that the reaction or process volume is a part of each resonant structure. The reaction or process volume is contained in a process or reaction chamber within a reaction vessel, to which the resonant structures and the respective generators are attached.

In this configuration, the generators can have different frequencies and phases, and still be matched to a common process or reaction volume. Only the process or reaction volume limits the input power. All of the resonant structures remain matched to their respective generators while all are coupled to the common reaction volume simultaneously. In this way, the system combines the advantages of multiple inputs and increased stability by having each generator coupled to its own resonant structure, wherein each resonant structure is in turn coupled to the common process or reaction volume.

In one aspect the present invention employs electromagnetic energy to break molecular bonds and thus reduce large molecules to smaller constituent parts. By way of example, the present invention uses electromagnetic energy to thin heavy oil so that it can more easily be transported through a pipeline. A feature of this invention is that it allows the application of several electromagnetic generators to a common reaction or process volume, where each generator is coupled to its own resonant structure, thus permitting larger electromagnetic fields, and each resonant structure is coupled to a common process or reaction volume. In addition to the process or breaking molecular bonds in heavy oil (known in the industry as "cracking"), this invention is applicable to any process or reaction requiring the application of electromagnetic energy. This includes, for example, reduction of toxic wastes, as well as other processes where it is not necessary to break chemical bonds, but rather just to for example etch a surface, manufacture ceramics or apply heat to a volume.

Another use of this invention is the refining, decomposing, disposing of, or rendering harmless various waste products, including toxic wastes. Since input power is limited only by the process or reaction substance itself, very high temperatures can be attained, enabling, for example, the breaking of even high energy bonds.

Further embodiments are also contemplated. Depending on the application, the resonant structures may be either single mode or multimode. The various generators can have different frequencies if desired, and different phases may be desired if some or all of the generators operate at the same frequency. This, combined with the spatial arrangement of the resonant structures with respect to the process or reaction volume, allows multi-frequency input to the process or reaction volume, coupling with electric or magnetic fields or both, and the establishment of rotating electric or magnetic fields of any orientation in the process or reaction volume. Output levels may be as low or as high as necessary to facilitate a particular process or reaction. Additionally, static (DC) electric and/or magnetic fields may be applied to the process or reaction volume.

While the present invention may be used to excite a plasma, it also can be used with gasses, liquids, solids or multi-phase combinations in the process or reaction volume. In one embodiment, the process or reaction material may be suspended in a carrier medium, such as a gas or a solvent or catalyst. Also, additives may be used to more effectively absorb the electromagnetic radiation.

In another embodiment, the resonant structures may be arranged and the inputs and phases controlled such that the arrangement produces a rotating electric or magnetic field within the reaction chamber. A rotating electric or magnetic field may be beneficial for some processes or reactions.

The process of creating a rotating electric field in the reaction volume with a single electromagnetic generator has been taught, for example in U.S. Pat. No. 4,792,732. In such prior art, the electric field is perpendicular to the axis of the reaction vessel. In one embodiment of the present invention, a plurality of electromagnetic generators are employed and the various resonant structures are arranged spatially and electrically to produce a rotating electric field with any orientation with respect to the process or reaction volume axis. In another embodiment, multiple resonant structures may be arranged in series along a reaction chamber to achieve sequential processing or complete reaction steps. Such series arrangements can also be used in parallel to increase the throughput of a reaction or process.

In another embodiment, the invention may further use an additional plasma source. In addition, one or more catalysts or gases may be injected or mixed to enhance various reactions occurring in the process or reaction volume.

In yet another embodiment, the invention may also use an apparatus for initiating a plasma where a gas, vapor, or atomized liquid is in the process or reaction volume.

In summary, the present invention employs a plurality of electromagnetic generators coupled to a plurality of resonant structures which in turn are coupled to a reaction chamber such that the reaction or process volume becomes a common load to each of the several resonant structures. This provides several advantages, including:

1. The power capacity is not limited by output capability of a single generator, its delivery system, or its resonant structure. Since the power from the plurality of generators is summed in the process or reaction volume, this volume is all that limits the power that can be delivered to whatever load is in the process or reaction volume.

2. Each generator is matched to its own resonant structure, and the various generators can have the same or different frequencies.

3. Various spatial and phase arrangements can couple either the electric field or the magnetic field to the process or reaction volume.

4. Rotating electric or magnetic fields can be produced in the process or reaction volume with any orientation.

5. Multiple resonant structures can be distributed along the process or reaction volume for sequential processing or reaction steps.

6. Multiple sets of series resonant structures can be used in parallel to increase the throughput of a process or reaction, 7. The individual resonant structures lessen the interaction between multiple generators coupled to the same process or reaction volume.

8. In the case of single mode resonant structures, plasmas tend to remain more stable since there is only one resonant spatial mode and various higher order modes cannot be excited. The present invention permits single mode operation without limiting the power that can be applied to a single mode due to the following factors. If only one single-mode resonant structure is connected to multiple generators, they must all have the same frequency and be locked to a common phase. Moreover, total input power is limited by the single resonant structure, the power combining method utilized, and/or the power delivery system. All of these restrictions are removed in the present invention 9. The apparatus of the present invention also can use a plasma source or carrying gas, catalyst or medium to further facilitate a process or reaction.

BRIEF DESCRIPTION OF THE DRAWINGS

Further features and advantages of the invention will be seen from the following detailed description, taken in conjunction with the accompanying drawings, wherein like numerals depict like parts, and wherein:

FIG. 5(*a*) shows a schematic diagram of the normal labeling of a waveguide. FIGS. 5(*b*)-5(*d*) show three different arrangements of multiple generators and resonant structures.

DETAILED DESCRIPTION OF THE INVENTION

Figure 1:
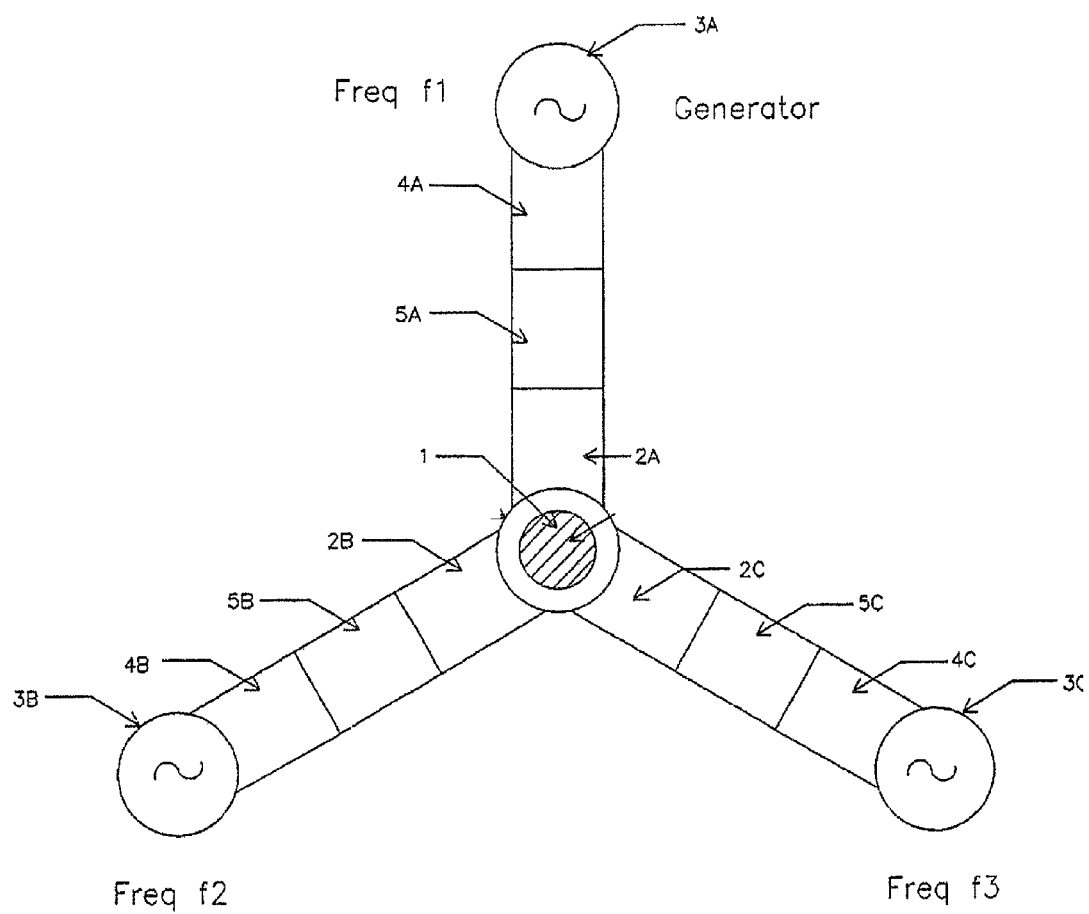
FIG. 1 is a schematic of one embodiment of the present invention showing three resonant structures coupled to individual generators.

FIG. 1 depicts a typical embodiment of the present invention, wherein three resonant structures 2 A-C are coupled to individual electromagnetic generators 3 A-C, and wherein the three resonant structures 2 A-C share the same process or reaction volume 1. The generators may have the same or different frequencies. Each generator delivers power through a delivery channel, for example a waveguide 4 A-C to a matching device. The matching devices 5 A-C impedance-match each generator to its resonant structure. Each resonant structure is in turn coupled to the same process or reaction vessel, with the included process or reaction volume. As will be explained later, part of the matching device is a part of the resonant structure and also the process or reaction chamber or vessel, with the enclosed process or reaction volume included in each resonant structure. The generators can operate at the same or different frequencies, and in the case where they operate at the same frequency, the resonant structures can be arranged spatially and in phase with respect to the process or reaction chamber or vessel to produce various effects, such as a rotating electromagnetic field in the common process or reaction volume.

Figure 2:
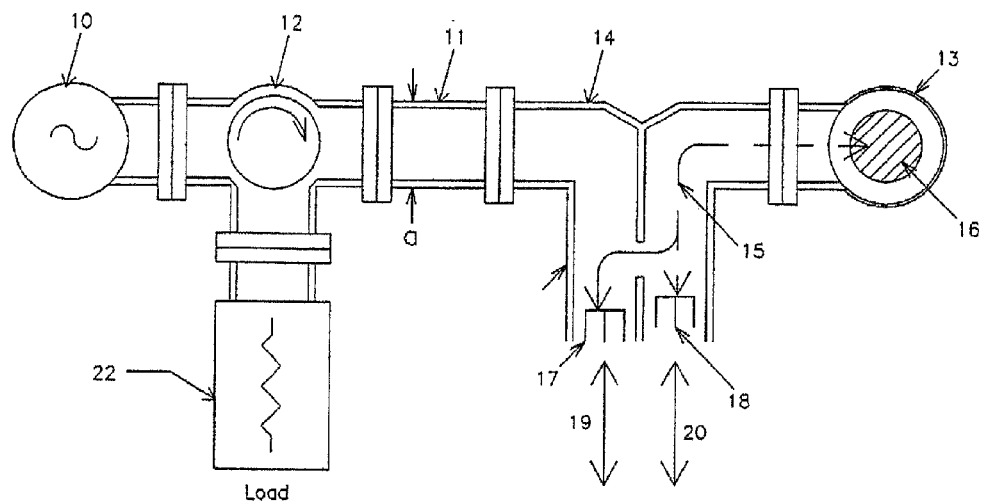
FIG. 2 illustrates a simple system with only one generator and resonant structure to facilitate explanation.
Figure 2:
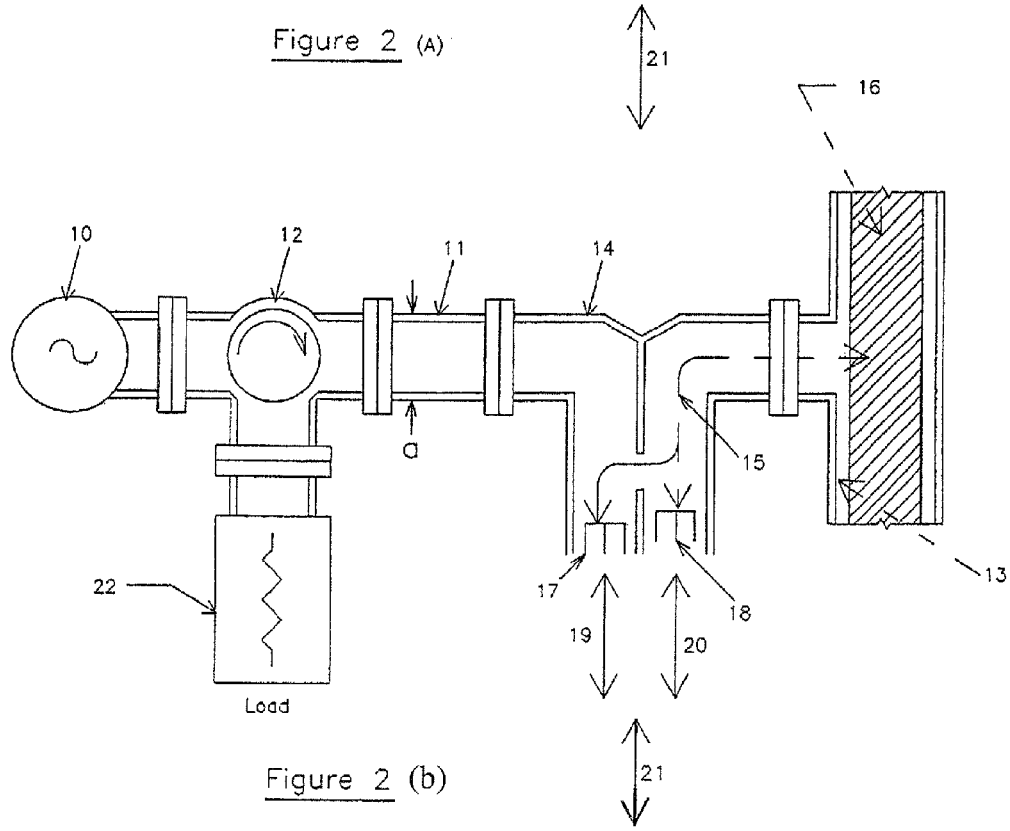

For explanatory purposes, we will first explain how a single generator is coupled to the resonant structure. As shown in FIG. 2, the electromagnetic generator 10 is a microwave generator, for example a magnetron, a klystron, or a gyrotron typically operating in the frequency range of 300 MHz to 300 GHz. Power from such a device can be, for example, from a few hundred watts to 100 kilowatts. The delivery means for these devices typically is a waveguide 11 that transmits a single mode. A specific example is a semiconductor processing plasma source magnetron which operates at a frequency of 2.45 GHz. The waveguide 11 for such a source typically would be a rectangular waveguide, type WR 284, with dimensions approximately 7.2×4.3 cm. Generally, the larger dimension of the waveguide is denoted by the letter "a", and the smaller dimension by "b". In such a waveguide, generally the lowest order mode, denoted by the TE10 mode has its electric field vector perpendicular to the "a" dimension. Generally in all the figures, a TE10 mode is shown, however other higher modes can be used for various applications. The source typically would be protected from back reflections by a circulator or isolator 12. Power reflected back toward the generator is directed to a dummy load 22. The waveguide would deliver power to the specially designed process or reaction vessel 13 through a matching device 14 to match the resonant structure (denoted by the dashed line) 15 to the waveguide delivery system. It should be noted that the resonant structure comprises the process or reaction volume, 16, the process or reaction vessel 13 and part of the matching device 14. An example of such a tuning device is a hybrid tuner, which permits tuning of the resonant frequency of the structure and the coupling coefficient of the input electromagnetic energy. The parts of the hybrid tuner are indicated schematically in the figure. Adjustment of the internal sliding members 17,18 allows adjustment of the coupling coefficient to the process or reaction vessel and volume when the sliding members 17,18 are adjusted individually 19,20 and adjustment of the resonant frequency when they are tuned at the same time 21. The coupling coefficient is a measure of how well the generator is matched to its load. Means is provided to adjust sliding members 17 and 18 separately as shown by the arrows 19,20 or at the same time, as shown by arrow 21. As explained before, the dashed arrow 15 denotes that part of the hybrid tuner that is part of the resonant structure. It should be noted again that the resonant structure includes part of the matching device, as well as the reaction vessel with the process or reaction volume inside. The process or reaction volume may in some cases be constrained by, for example, a tube of quartz or ceramic.

Note that in FIGS. 2a and 2b the resonant structure has the "a" dimension of the waveguide and resonant structure perpendicular to the process or reaction volume axis in 2a and the "b" dimension perpendicular in 2b. Different orientations cause better coupling of the E or the H field of the input electromagnetic radiation, depending on various circumstances. In FIG. 2b, the process or reaction volume has been rotated 90 degrees spatially with respect to the "a" dimension of the waveguide and resonant structure.

Devices other than a hybrid tuner may be used to match the generator to the resonant structure. Other examples of such devices are a stub tuner, a so-called EH tuner, which allows independent adjustment of the E and H fields, as so-called magic tee, and a waveguide of variable length between the matching device and the process or reaction vessel. These matching means are well known to those skilled in the art.

Other sources or electromagnetic energy, including for example, low frequency generators or even static (DC) electric or static magnetic fields may additionally be coupled to the process or reaction vessel with the included process or reaction volume.

Figure 3:
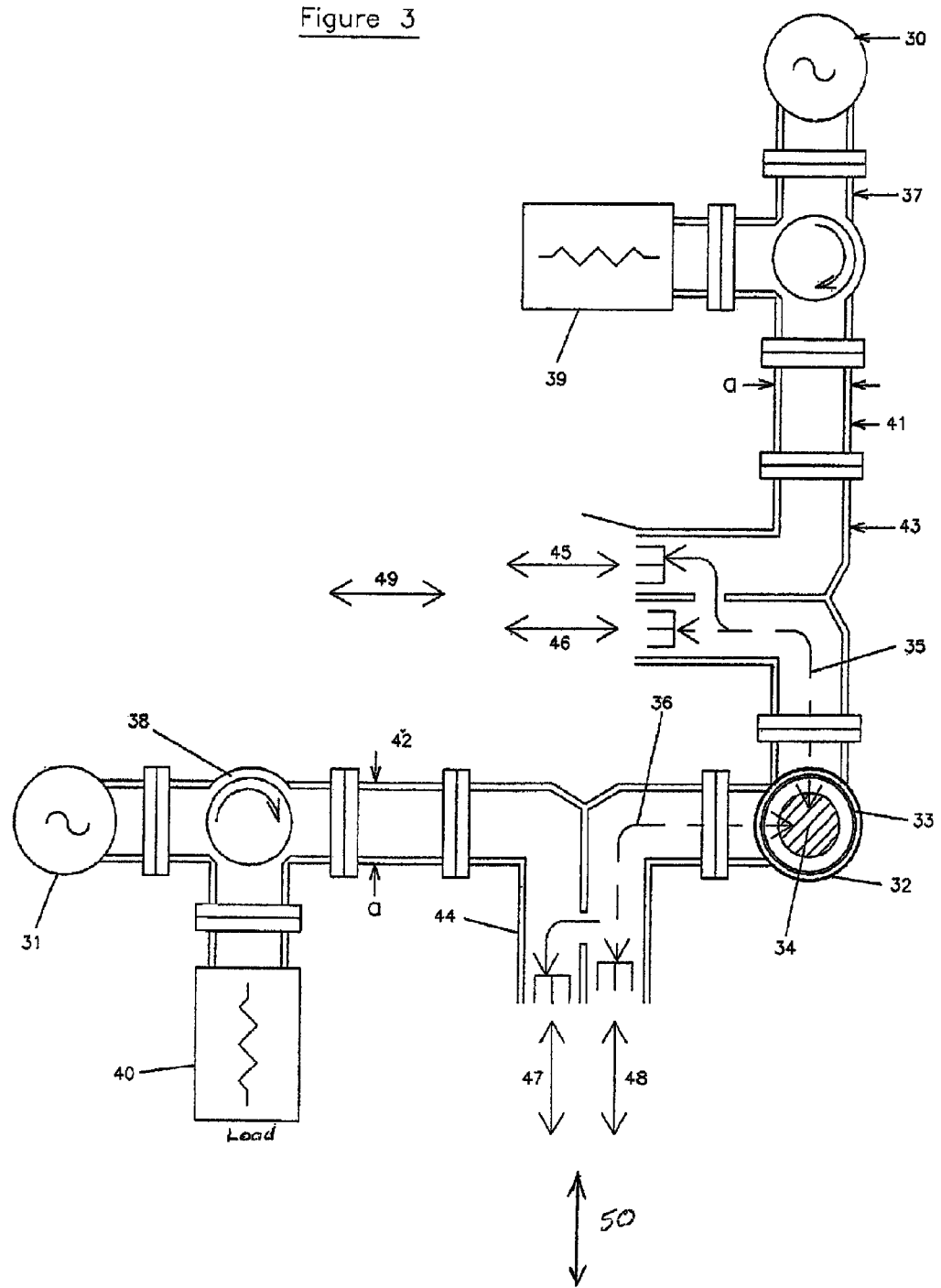
FIG. 3 shows an embodiment with two generators and resonant structures coupled to the same process or reaction volume.

FIG. 3 shows an embodiment with two generators 30, 31. The process or reaction vessel 32 containing the process or reaction volume 34, which may in some cases be contained in a process or reaction chamber 33 (for example a quartz or ceramic tube), is common to both of the resonant structures 35,36. As explained previously, the resonant structure in each case is made up of the common reaction vessel with the included process or reaction chamber with the included reaction process or reaction volume, and part of the matching device. The process or reaction volume may or may not be in contact with the process or reaction chamber walls. As previously explained, the process or reaction volume may also be contained in some apparatus, such as a flow tube inside the process or reaction vessel. The material being processed or reacted upon may be stationary or flowing through the process or reaction volume.

The electromagnetic generators may for example be a klystron or a magnetron or other electromagnetic generating device. Generally, the larger the interaction volume, the lower the frequency must be. In the range above about 300 MHz, generally a magnetron or a klystron is used. Each generator is protected from power flowing back toward the source due to reflections from the apparent load by a protection device 37,38 as in the case of the single generator case explained previously. A typical device is a circulator, which directs reflected energy to a dummy load 39,40. As before, each generator is connected to the load typically by a waveguide 41,42, and each generator is matched to its load by a matching device 43,44, such as a hybrid tuner, with movable parts to enable frequency adjustment and adjustment of the coupling coefficient. As before, the dashed lines 35,36 denote that the resonant structures include the process or reaction chamber with the included process or reaction volume and also part of the matching devices. As before, the individual movable tuning parts can be adjusted individually as denoted by the arrows 45,46,47,48 or at the same time as denoted by the arrows 49,50.

Each delivery system, from the two generators, is coupled to its own resonant structure, which may be either single mode or multimode, although generally single mode will be preferred. In the embodiment shown in FIG. 3, the two generators have different frequencies, f1 and f2. Thus the waveguides would be different sizes, and the hybrid tuners would be correspondingly different. If the two generators had the same frequency and phase locked with a 90 degree phase shift, then a rotating field would be produced in the process or reaction vessel.

Figure 4:
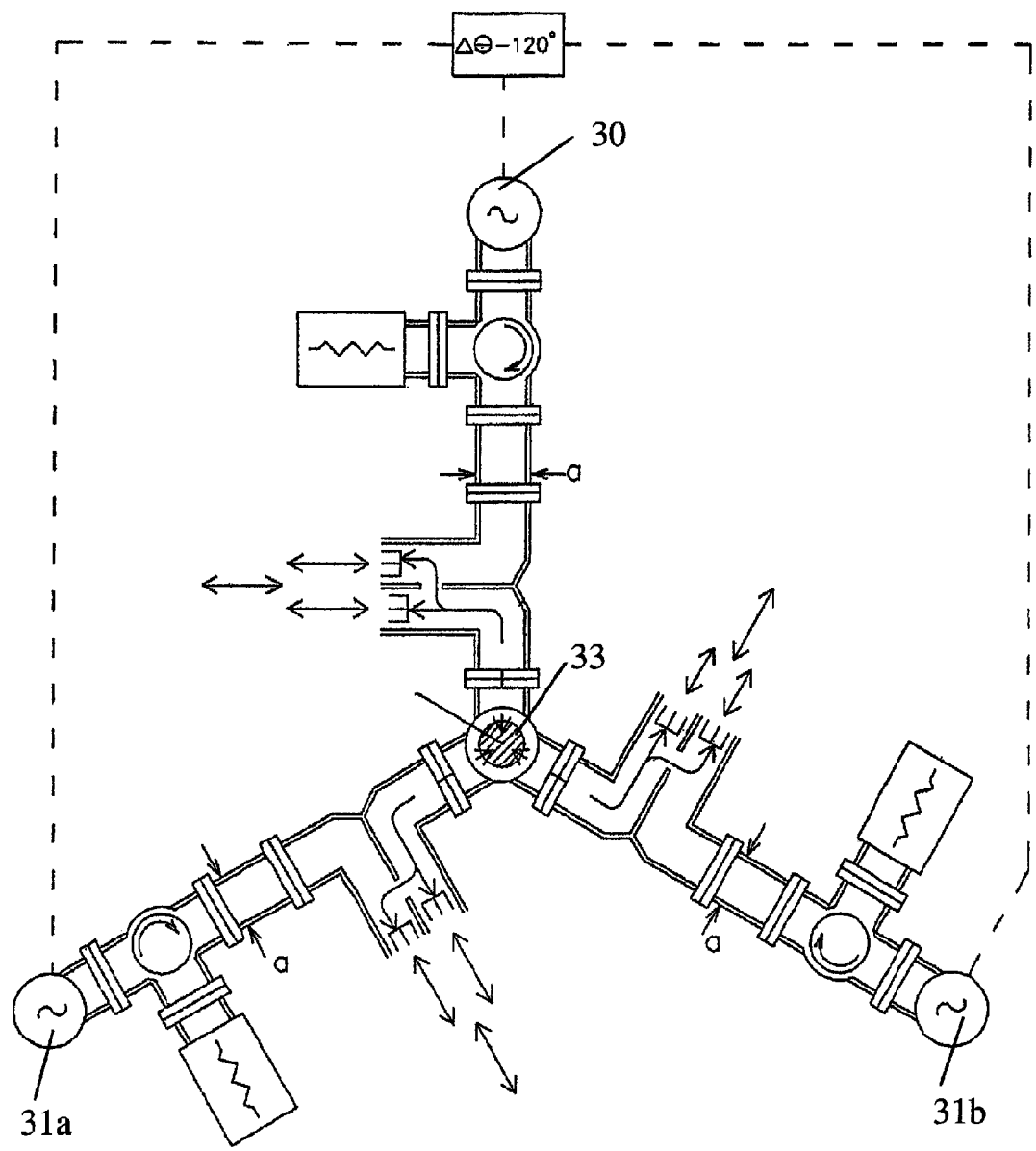
FIG. 4 shows three different generators and resonant structures coupled to the same process or reaction volume.

FIG. 4 shows three generators 30, 31a, 31b connected to the same reaction vessel. As before, each generator is isolated by an appropriate means, coupled by a waveguide to its own matching device, and all three matching devices are coupled to the same process or reaction vessel, containing the process or reaction volume. As before, the generators can be the same or different frequencies. If all three generators have the same frequency, are 120 degrees apart in space as shown, and are locked in phase 120 degrees apart electrically as shown, then a rotating field is produced in the process or reaction vessel. As shown, the "a" dimension of the waveguide and matching devices is perpendicular to the process or reaction volume axis. This would produce a rotating magnetic field perpendicular to the process or reaction volume axis. If all three generators and matching devices were rotated 90 degrees in space so that the "b" axis of the waveguide and matching device was perpendicular to the process or reaction volume axis, then a rotating electric field would be produced in the plane perpendicular to the process or reaction volume axis. As explained before, if the generators have different frequencies, then rotating fields cannot be produced, but the power from all three generators are still summed in the reaction vessel.

FIG. 5 shows three other arrangements of multiple sources. FIG. 5a shows schematically the "a" and "b" dimensions of the waveguide. FIG. 5b is similar to FIG. 3, except in the case of FIG. 5b the two generators have the same frequency and are locked in phase with a 90 degree electrical phase shift between them. This will produce a rotating field. FIG. 5c also shows two generators, but of different frequencies coupled to the same process or reaction volume. In this case the waveguides and matching devices are rotated so that the "b" dimension of the waveguide and matching device is perpendicular to the process or reaction volume axis, rather than the "a" dimension in as in FIG. 5b. FIG. 5d shows three generators 30, 31a, 31b of different frequencies coupled to the same process or reaction volume. In this case, there are no rotating fields, and the power from all three generators is summed in the common process or reaction volume. The matching devices work as previously explained. Note that the waveguides and matching devices would have different dimensions for each generator because of the different frequencies, being larger for lower frequencies.

This same concept can be extended to more sources. In general, if N sources of the same frequency are arranged 360/N degrees apart in space and in electrical phase, a rotating field will be produced. If the plane of the plurality of the resonant structures is inclined to the process or reaction volume axis, then a rotating field is produced in that plane. Such rotating fields may be beneficial for some processes or reactions.

Other arrangements of generators and resonant structures may be made by those skilled in the art following the above description.

Figure 6:
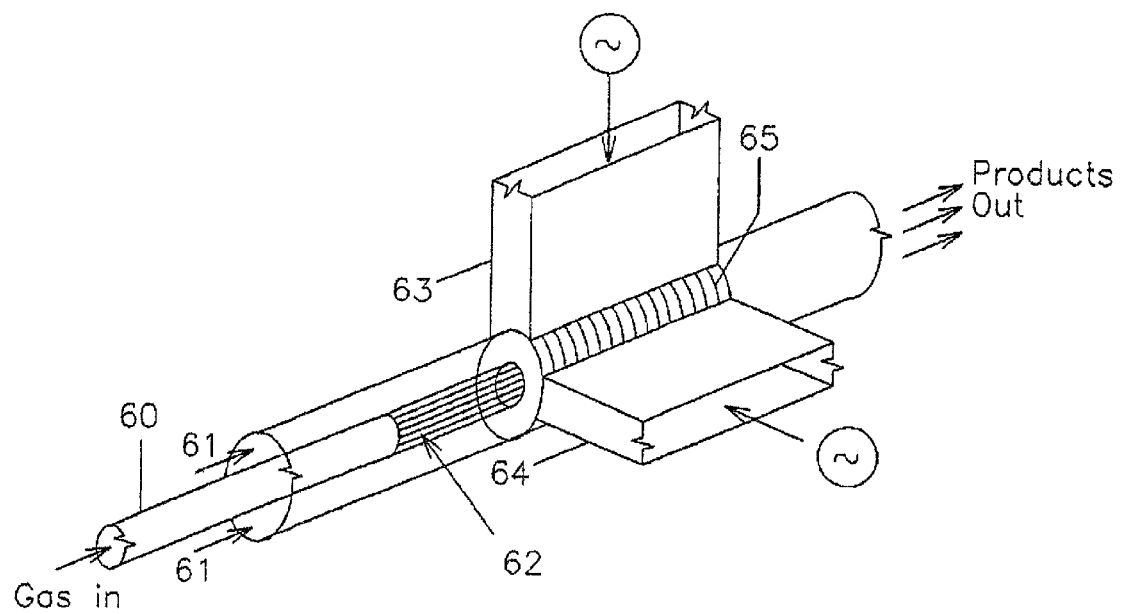
FIG. 6 is an illustration of a combination of a plasma source and coupled resonant structures all exciting the same process or reaction volume.

In some cases, it may be desirable to also inject a plasma into the process or reaction volume. This may be done, for example with a plasma source or the like. FIG. 6 shows a plasma source 60 arranged in accordance with the present invention. The material to be processed or reacted upon 61 may be stationary or flowing. In either case, the plasma source can be injected into the process or reaction volume. Moreover, multiple plasma sources can be coupled to the reaction volume in order to promote process or reaction speed. If desired, catalysts can be injected into the reaction volume to promote a process or a reaction. Further, a carrying gas may be used to promote, for example plasma formation. Other substances, such as water for example, can be added or mixed with the substance being processed or reacted upon to promote the process or reaction. For instance, the addition of water to heavy oil may improve heating of the mixture to attain high temperatures more rapidly. It is known that water couples well to microwave radiation due to the polar nature of the water molecule. FIG. 6 shows the injected plasma 62, typically a highly ionized gas, and the resonant structures 63,64 coupled to the common process or reaction volume 65.

Figure 7:
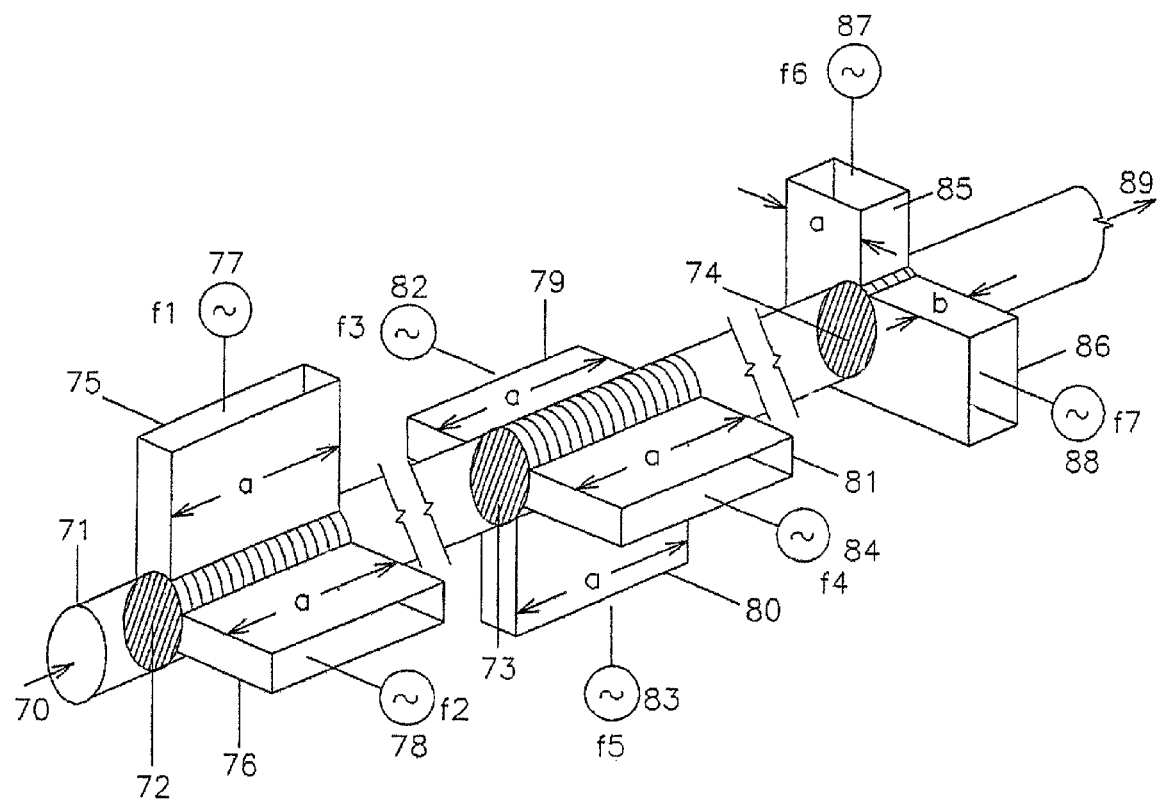
FIG. 7 shows multiple sets of resonant structures arranged in series along a process or reaction volume.

The various resonant structures can be arranged in series to achieve more efficient processing or reaction. FIG. 7 illustrates one example of such a configuration. Other arrangements are also contemplated. The frequencies, as mentioned before, can be the same or different, and the resonant structures can be oriented to couple more resonant structures to the process or reaction volume, to couple the electric or the magnetic field or both to the process or reaction volume, or to produce rotating fields in the process or reaction volume. Moreover, various arrangements of the resonant cavities can be made along an extended process or reaction volume either to further a process or reaction step or to add another process or reaction step to the material being processed or interacted upon. In this figure, material to be processed 70 is introduced into the reaction vessel 71 and is acted upon sequentially by three sets of coupled resonant cavities, exciting three process or reaction volumes 72,73,74. The first pair of resonant structures 75,76 for the first reaction chamber 72 has the "a" dimension of the waveguide parallel to the reaction vessel axis. The frequencies of the two generators 77,78 can be the same or different, as explained before. Also as before, each resonant structure including the process reaction volume is matched to its driving source. This may be accomplished, for example, by a hybrid tuner 14, as in FIG. 2. Note that the entire chain of generator, circulator, dummy load, waveguide, and matching device is represented in FIG. 7 by just a generator and a line connecting it to the resonant structures. If the frequencies are equal and 90 degrees out of phase electrically, as explained before, a rotating field will be produced in the shared process or reaction volume 72. The second set of resonant structures 79,80,81 is coupled to a second process or reaction volume 73. The three generators 82,83,84 in this case could be the same or different frequencies. These three resonant structures also are aligned so that the "a" dimension is parallel to the reaction vessel axis. The third set of resonant cavities 85,86 is arranged with the "b" axis of the resonant cavity parallel to the reaction volume 74. The two generators 87,88 may have the same or different frequencies. If they are the same and 90 degrees out of phase electrically, a rotating field would be produced in the process or reaction volume 74. The output from the series of process or reaction steps is shown by 89. As explained before, for simplicity the entire chain of generator, circulator, waveguide, and matching device would be coupled to the process or reaction volumes shown in FIG. 7. For simplicity, only the generator and part of the resonant structure is shown in each case. Of course, it is also obvious that parallel arrangements of the invention are also possible.

An application of particular interest is the process of breaking chemical bonds in large molecules. One application of this is, for example, to break molecular bonds in long hydrocarbon chains so that simpler hydrocarbons are produced. Such a process could for example, reduce heavy, viscous oil to a less viscous consistency so that it more easily can be pumped through a pipe, without the need or cost of adding a solvent or diluent, which adds significant cost to a barrel of oil. Thus, the ability of a system such as in the present invention to break some molecular bonds and make the oil less viscous would have enormous impact on the petroleum industry.

Another important use of this invention is in the application of refining, decomposing, disposing of, or rendering harmless various waste products, including toxic wastes. Since input power is limited only by the process or reaction substance itself, very high temperatures can be attained, enabling the breaking of even high energy bonds.

Figure 8:
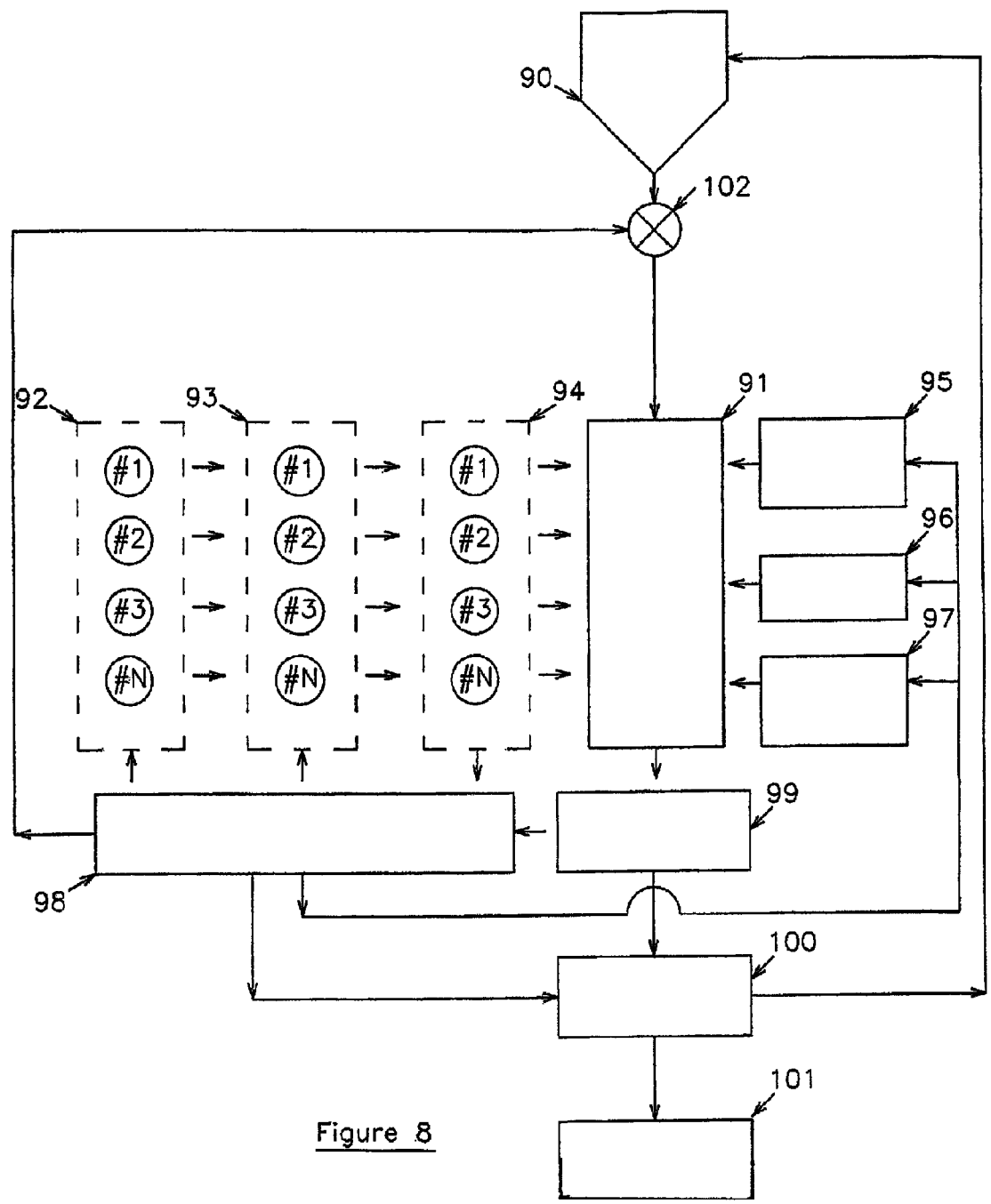
FIG. 8 is a schematic of an integrated system in accordance with the present invention.

FIG. 8 shows a typical installation of the proposed invention where the process is for breaking down an input material 90. This could be, for example, heavy oil. In this process, some of the long hydrocarbon chains would be broken into shorter ones in the reaction vessel 91. Various generators 92, matching devices 93, and monitors 94 are shown. As mentioned before various plasma sources 95, catalysts 96, and other materials 97 may also be used with this invention, as is common in the art. A control system 98, would control the whole process. A raw product analyzer 99, would provide input to the process control. A separator 100 would separate finished product 101 from unprocessed or un-reacted input, and would send unprocessed product back to the start of the process. An input flow control device 102 would control the input to the process.

WORKING EXAMPLES

In order to demonstrate the principles of this invention a prototype system was built comprising a single microwave generator coupled to a single resonant structure. A klystron was used as the microwave source, and the resonant structure was built around a rectangular waveguide. Two different hydrocarbon liquids, SAE 30 motor oil and kerosene, were used in two different working examples. The liquids were atomized into the resonant structure, and a plasma was initiated using a spark discharge in conjunction with the injected microwaves.

With an input power of 800 watts at a frequency of 5.945 GHz, with no plasma, the Q of the resonant structure was measured to be 52, implying a stored power of 41 kilowatts. When the plasma was initiated, the Q dropped to 5 (4 kilowatts stored). The resonant structure was returned to maintain resonance, so that all of the power was absorbed by the plasma. The net power delivered to the plasma was the input power of 800 watts. The decrease in the cavity Q is due to the lossy plasma.

The liquid flow through the reaction chamber was set at 4 liters per hour. Significant amounts of gas were given off by the cell and exceeded the capacity of the Matheson gas flow meter that was used. The meter had a capacity of 2 liters per minute. The temperature of the input liquid was room temperature, 22 degrees C. The exit temperature of the liquid was 31 degrees C.

The liquid exiting the cell was changed in appearance and viscosity. Both the motor oil and the kerosene were noticeably darker. Both the motor oil and the kerosene had entrained carbon particles that settled out after a few days. The presence of the carbon of course demonstrates that the hydrocarbon molecules were broken apart, sometimes yielding elemental carbon. After the carbon particles settled out, the motor oil was observed to be lighter than before treatment, and the kerosene was observed to return to its original color.

After cooling the liquid was noticeably easier to pour, indicating lower viscosity.

While much of the discussion has focused on processing heavy oil, it will be recognized that this invention can be used for any process or reaction that uses electromagnetic energy to process something or to promote a chemical reaction of some sort. The invention also may be used for other processes which involve microwave heating such as to make ceramic e.g. silicon carbide cutting tools, semiconductor boules, etc.

The embodiments and examples set forth herein were presented in order to best explain the present invention and its practical application and to thereby enable those of ordinary skill in the art to make and use the invention. However, the foregoing description and examples have been presented for the purposes of illustration and example only, and the description as set forth is not intended to be exhaustive or to limit the invention to the precise form disclosed. For example, other types of generators, delivery and, tuning devices, frequencies, and other common techniques such as using a carrying gas or solvent or using catalysts in the process or reaction chamber along with the substance that is being processed or reacted upon may be employed. Yet other modifications and variations are possible in light of the teachings above without departing from the spirit and scope of the present invention.

What is claimed is:

1. An apparatus for exciting a process or reaction medium with electromagnetic radiation comprising:
    a process or reaction vessel with a resonant chamber for containing a process or reaction volume; and
    a plurality of electromagnetic generators, wherein each of said plurality of electromagnetic generators is coupled and impedance-matched to a respective one of a plurality of resonant structures, wherein each of said resonant structures includes a resonant chamber and a process or reaction volume, and wherein each of said plurality of resonant structures is coupled and tuned to said resonant chamber such that the entire process or reaction volume becomes common load to, and resonant with, each of said plurality of electromagnetic generators, wherein said plurality of electromagnetic generators are configured to deliver a combined power to the process or reaction volume that operably exceeds a maximum power output of a single one of said plurality of electromagnetic generators.

2. The apparatus of claim 1, wherein the plurality of resonant structures are either single mode or multimode.

3. The apparatus of claim 2, wherein N resonant structures are physically arranged about said process or reaction volume to be 360°/N apart, and said N electromagnetic generators that operate at the same frequency are 360°/N apart in phase such that the said apparatus produces a rotating electromagnetic field.

4. The apparatus of claim 1, wherein each of said plurality of electromagnetic generators are either microwave or radio frequency (RF) generators.

5. The apparatus of claim 1, wherein each of said plurality of electromagnetic generators are coupled to the respective resonant structure by a delivery channel.

6. The apparatus of claim 5, further comprising a tuning device for individually tuning each of said plurality of resonant structures to said common load.

7. The apparatus of claim 5, wherein said delivery channel includes a waveguide or coaxial line.

8. The apparatus of claim 6, wherein the tuning device is selected from the group consisting of a hybrid tuner, a stub tuner, an E-H tuner, a magic tee and a variable length waveguide.

9. The apparatus of claim 1, further comprising a tuning and/or coupling device for individually matching each of said plurality of electromagnetic generators to its respective resonant structure.

10. The apparatus of claim 9, wherein the tuning device is a hybrid tune.

11. The apparatus of claim 1, wherein said plurality of resonant structures are arranged oriented about said resonant chamber.

12. The apparatus of claim 1, wherein N resonant structures are separated by 360°/N in a single plane, or are arranged arbitrarily in a single plane.

13. The apparatus of claim 1, wherein at least two of said plurality of electromagnetic generators operate at different frequencies.

14. The apparatus of claim 1, wherein said plurality of electromagnetic generators operate at the same frequency at different phases.

15. The apparatus of claim 14, wherein two of said electromagnetic generators produce radiation that is 90° apart in phase.

16. The apparatus of claim 1, wherein at least one of said plurality of electromagnetic generators produces a stationary electric field (DC).

17. The apparatus of claim 1, wherein at least one of said plurality of electromagnetic generators produces a static magnetic field.

18. The apparatus of claim 1, wherein at least one of said plurality of electromagnetic generators produces low frequency radiation.

19. The apparatus of claim 1, wherein said process or reaction volume contains gas(es), liquid(s), solids or a multiphase combination.

20. The apparatus of claim 1, wherein said process or reaction medium contains a plasma.

21. The apparatus of claim 1, wherein the exciting of said process or reaction medium with electromagnetic radiation ignites a plasma.

22. The apparatus of claim 1, further comprising a plasma source.

23. The apparatus of claim 1, further comprising a feed for adding a catalyst into said process or reaction medium to aid in absorption of electromagnetic energy.

24. The apparatus of claim 23, wherein the reaction medium comprises water.

25. The apparatus of claim 1, further comprising a device for varying output of each of said plurality of electromagnetic generators.

26. The apparatus of claim 1, further comprising a monitoring device for monitoring the process or reaction medium.

27. The apparatus of claim 1, further comprising an inlet and an outlet for the process or reaction medium.

28. The apparatus of claim 1, wherein the process or reaction medium comprises molecules comprising hydrocarbon chains.

29. The apparatus of claim 28, wherein the process or reaction medium comprises crude oil.

30. An apparatus for exciting a process or reaction medium with microwave radiation comprising:
a process or reaction vessel with a resonant chamber for containing a process or reaction volume; and
a plurality of microwave generators, wherein each of said plurality of microwave generators is coupled and impedance-matched to a respective one of a plurality of resonant structures, wherein each of said resonant structures includes a resonant chamber and a process or reaction volume, and wherein each of said plurality of resonant structures is coupled and tuned to said resonant chamber such that the entire process or reaction volume becomes a common load to, and resonant with, each of said plurality of microwave generators, wherein said plurality of microwave generators are configured to deliver a combined power to the process or reaction volume that operably exceeds a maximum power output of a single one of said plurality of microwave generators.

31. The apparatus of claim 30, wherein the plurality of resonant structures are either single mode or multimode.

32. The apparatus of claim 30, wherein said plurality of microwave generators produce radiation at a frequency between 300 MHz and 300 GHz.

33. The apparatus of claim 30, further comprising a device for varying output of each of said plurality of microwave generators.

34. The apparatus of claim 30, further comprising a feed for adding water to the process or reaction medium to aid in the absorption of said microwave radiation.

35. An apparatus for exciting a process or reaction medium with electromagnetic radiation comprising:
a process or reaction vessel with a resonant chamber for containing a process or reaction volume; and
a plurality of electromagnetic generators, wherein each of said plurality of electromagnetic generators is coupled and impedance-matched to a respective one of a plurality of resonant structures, wherein each of said resonant structures includes a resonant chamber and a process or reaction volume, and wherein each of said plurality of resonant structures is coupled and tuned to said resonant chamber such that the entire process or reaction volume becomes common load to, and resonant with, each of said plurality of electromagnetic generators, and wherein said resonant structures are arranged so that a rotating electromagnetic field may be created in said process or reaction volume, wherein said plurality of electromagnetic generators are configured to deliver a summed power to the process or reaction volume.

36. The apparatus of claim 35, further comprising a matching tuner for individually matching each of said plurality of electromagnetic generators to its corresponding resonant structure.

37. The apparatus of claim 36, wherein the matching tuner is selected from the group consisting of a hybrid tuner, a stub tuner, an EH tuner, a magic tee and a variable length waveguide.

38. The apparatus of claim 35, wherein each of said plurality of electromagnetic generators are coupled to the corresponding resonant structure by a waveguide or coaxial line.

39. The apparatus of claim 35, wherein N resonant structures are physically arranged about said process or reaction volume to be 360°/N apart, and said N electromagnetic generators that operate at the same frequency are 360°/N apart in phase the said apparatus produces a rotating electromagnetic field.

40. An apparatus for exciting a process or reaction medium with electromagnetic radiation, comprising:
a process vessel having a plurality of resonant chambers connected in series, each resonant chamber containing a process or reaction volume, wherein a plurality of resonant structures are coupled and tuned to each of said plurality of resonant chambers, each of said resonant structures including a corresponding process or reaction volume as part of a common load for each resonant chamber; and wherein each of said plurality of resonant structures is coupled and impedance-matched to a respective electromagnetic generator, wherein said electromagnetic generators are configured to deliver a summed power to the process or reaction volumes.

41. The apparatus of claim 40, wherein the plurality of resonant structures is either single mode or multimode.

42. The apparatus of claim 41, further comprising an inlet and an outlet for passing process or reaction medium between said resonant chambers.

43. A method for treating a process or reaction medium comprising:
introducing the process or reaction medium into a resonant chamber; and
exciting the process or reaction medium with a plurality of electromagnetic generators, wherein each of said plurality of electromagnetic generators is coupled and impedance-matched to a respective one of a plurality of resonant structures, wherein each of said resonant structures includes a resonant chamber and a process or reaction medium, and wherein each of said plurality of resonant structures is coupled and tuned to said resonant chamber such that the process or reaction medium becomes common load to, and resonant with, each of said plurality of electromagnetic generators, wherein said plurality of electromagnetic generators are configured to deliver a combined power to the process or reaction volume that operably exceeds a maximum power output of a single one of said plurality of electromagnetic generators.

44. The method of claim 43, wherein the process or reaction medium comprises a toxic waste, and the treatment breaks chemical bonds of molecules in the waste.

45. The method of claim 44, including the step of adding water to the toxic waste.

46. The method of claim 43, wherein the process or reaction medium comprises a reactant, and the treatment promotes reaction.

47. The method of claim 46, including the step of adding a catalyst or water to the reactant.

48. The method of claim 43, wherein the process or reaction medium comprises a hydrocarbon medium, and the treatment facilitates pumping of the hydrocarbon medium.

49. The method of claim 48, including the step of adding a catalyst or water to the hydrocarbon medium.

50. The method of claim 48, wherein the hydrocarbon medium comprises oil.

51. A method for treating a process or reaction medium comprising:
introducing the process or reaction medium into a resonant chamber; and
exciting the process or reaction medium with a plurality of electromagnetic generators, wherein each of said plurality of electromagnetic generators is coupled and impedance-matched to a respective one of a plurality of resonant structures, wherein each of said resonant structures includes a resonant chamber and a process or reaction medium, and wherein each of said plurality of resonant structures is coupled and tuned to said resonant chamber such that the process or reaction medium becomes common load to, and resonant with, each of said plurality of electromagnetic generators, whereby a rotating magnetic field is created in the process or reaction medium, wherein said plurality of electromagnetic generators are configured to deliver a summed power to the process or reaction volume.

52. The method of claim 51, wherein the process or reaction medium comprises a toxic waste, and the treatment breaks chemical bonds of molecules in the waste.

53. The method of claim 52, including the step of adding water to the toxic waste.

54. The method of claim 51, wherein the process or reaction medium comprises reactant, and the treatment promotes a reaction.

55. The method of claim 54, including the step of adding a catalyst or water to the reactant.

56. The method of claim 54, wherein N resonant structures are physically arranged about said process or reaction volume to be 360°/N apart, and N electromagnetic generators that operate at the same frequency are 360°/N apart in phase the said apparatus produces a rotating electromagnetic field.

57. The method of claim 54, wherein N resonant structures are arranged arbitrarily in a single plane.

58. The method of claim 51, wherein the process or reaction medium comprises a hydrocarbon medium, and the treatment facilitates pumping of the hydrocarbon medium.

59. The method of claim 58, including the step of adding a catalyst or water to the hydrocarbon medium.

60. The method of claim 59, wherein the process or reaction medium comprises a hydrocarbon medium, and the treatment facilitates pumping of the hydrocarbon medium.

61. The method of claim 60, including the step of adding a catalyst of water to the hydrocarbon medium.

62. The method of claim 60, wherein the hydrocarbon medium comprises oil.

63. The method of claim 58, wherein the hydrocarbon medium comprises oil.

64. A method for treating process or reaction medium comprising:
introducing the process or reaction medium into a plurality of resonant chambers connected in series, wherein a plurality of resonant structures are coupled and tuned to each of said plurality of resonant chambers, each of said resonant structures including a corresponding process or reaction medium as part of a common load for each resonant chamber; and
exciting the process or reaction medium in each resonant chamber with a plurality of electromagnetic generators, wherein each of said plurality of electromagnetic generators is coupled and impedance matched to a respective one of said resonant structures, wherein said electromagnetic generators are configured to deliver a summed power to the process or reaction volumes.

65. The method of claim 64, wherein the process or reaction medium comprises toxic waste, and the treatment breaks chemical bonds of molecules in the waste.

66. The method of claim 65, including the step of adding water to the toxic waste.

67. The method of claim 64, wherein the process or reaction medium comprises a reactant, and the treatment promotes a reaction.

68. The method of claim 67, including the steps of adding a catalyst or water to the reactant.

69. A method for heating a volume to promote a process or reaction on a medium consisting of gas(ses), liquid(s) solid(s) or multi-phase combinations comprising:
introducing the medium into a resonant chamber; and
exciting the medium with a plurality of electromagnetic generators, wherein each of said plurality of electromagnetic generators is coupled and impedance-matched to a respective one of a plurality of resonant structures, wherein each of said resonant structures includes a resonant chamber and the medium, and wherein each of said plurality of resonant structures is coupled and tuned to said resonant chamber such that the medium becomes common load to, and resonant with, each of said plurality of electromagnetic generators, wherein said plurality of electromagnetic generators are configured to deliver a combined power to the process or reaction volume that operably exceeds a maximum power output of a single one of said plurality of electromagnetic generators.

70. The method of claim 69, wherein N resonant structures are physically arranged about said process or reaction volume to be 360°/N apart, and N electromagnetic generators that operate at the same frequency are 360°/N apart in phase the said apparatus produces a rotating electromagnetic field.

71. The method of claim 69, wherein N resonant structures are arranged arbitrarily in a single plane.

* * * * *